(12) United States Patent
Labrecque et al.

(10) Patent No.: US 8,098,163 B2
(45) Date of Patent: Jan. 17, 2012

(54) BIRTH MONITORING SYSTEM FOR PIGLETS

(75) Inventors: Serge Labrecque, St. Bernard de Dorchester (CA); Robert Labrecque, St. Bernard de Dorchester (CA); Germain Labrecque, St. Bernard de Dorchester (CA)

(73) Assignee: Conception Ro-Main Inc, St. Bernard, QC (CA)

( * ) Notice: Subject to any disclaimer, the term of this patent is extended or adjusted under 35 U.S.C. 154(b) by 221 days.

(21) Appl. No.: 12/023,692

(22) Filed: Jan. 31, 2008

(65) Prior Publication Data

US 2008/0266115 A1 Oct. 30, 2008

(51) Int. Cl.
*G08B 23/00* (2006.01)
(52) U.S. Cl. .................. 340/573.1; 392/422; 119/508; 119/58; 236/3
(58) Field of Classification Search ............... 340/573.3, 340/573.1, 573.5; 62/132; 119/58, 508; 236/3; 392/422
See application file for complete search history.

(56) References Cited

U.S. PATENT DOCUMENTS

| | | | | | |
|---|---|---|---|---|---|
| 3,028,097 | A | * | 4/1962 | Johnson | 237/14 |
| 3,265,246 | A | * | 8/1966 | Messenger | 221/283 |
| 4,227,485 | A | | 10/1980 | Poore | |
| 4,264,900 | A | | 4/1981 | Charlier | |
| 4,319,583 | A | | 3/1982 | Ingle | |
| 4,348,986 | A | * | 9/1982 | Marrs | 119/508 |
| 4,368,377 | A | * | 1/1983 | Smeds | 392/422 |
| 4,478,175 | A | | 10/1984 | Fisher | |
| 4,651,677 | A | | 3/1987 | de Wit | |
| 4,793,287 | A | * | 12/1988 | Hofmann | 119/505 |
| 5,163,234 | A | * | 11/1992 | Tsukamoto et al. | 34/487 |
| 5,310,310 | A | * | 5/1994 | Nakatsukasa et al. | 415/214.1 |
| 6,116,190 | A | * | 9/2000 | Kitt | 119/503 |
| 6,899,516 | B2 | * | 5/2005 | Wang | 415/60 |
| 7,165,508 | B2 | * | 1/2007 | Bryant | 119/446 |

(Continued)

FOREIGN PATENT DOCUMENTS

CA 2501894 * 10/2006

(Continued)

OTHER PUBLICATIONS

Veng System, The Intelligent Heat Lamp, 2003, Veng System, pp. 1-4.*

(Continued)

*Primary Examiner* — Benjamin C Lee
*Assistant Examiner* — Quang D Pham
(74) *Attorney, Agent, or Firm* — Adrian D. Battison; Ade & Company Inc.

(57) ABSTRACT

The number of piglets dying at birth is reduced by providing a temperature sensor in a farrowing crate at the piglet area thereof on a movable cover so that, when the sow is expected to give birth, the sensor is located in the crate at a location to detect the presence of one or more piglets after birth. On detection by a control unit using the sensor signal of the one or more piglets, the sensor communicates a signal to a pager carried by an operator indicating to the operator that birth of piglets is in progress and activates a heating lamp for the piglets in the pen to attract them away from the area of the sow to reduce crushing. The control unit and the sensor also control the heat output. The cover can slide along the piglet area and can lift to expose the piglet area.

5 Claims, 6 Drawing Sheets

U.S. PATENT DOCUMENTS

| | | | |
|---|---|---|---|
| 7,516,905 B2* | 4/2009 | Jaeger et al. | 236/3 |
| 2005/0028254 A1* | 2/2005 | Whiting | 4/213 |
| 2006/0016899 A1* | 1/2006 | Jaeger et al. | 236/3 |
| 2007/0221137 A1* | 9/2007 | Lareau | 119/503 |
| 2007/0262859 A1* | 11/2007 | Henry | 340/539.11 |

FOREIGN PATENT DOCUMENTS

| | | |
|---|---|---|
| EP | 0 108 330 A1 | 5/1984 |
| WO | WO 02/46850 | 6/2002 |
| WO | WO03/056907 A1 | 7/2003 |
| WO | WO-03/056907 A1 * | 7/2003 |

OTHER PUBLICATIONS

Veng System—brochure (4 pages).

* cited by examiner

BIRTH MONITORING SYSTEM FOR PIGLETS

This invention relates to a method for detecting the onset of birth of piglets. This can be used for example to communicate to an operator when birth is occurring to allow operator intervention to reduce piglet loss at birth and to control a heating system to attract the piglets away from the sow to prevent crushing and so that the heating system is actuated only when required to reduce heating costs.

BACKGROUND OF THE INVENTION

It is known in regard to the raising of animals, particularly cows and dogs, that a device may be provided to detect the onset of the birthing process commonly by attaching the device to the vagina or vulva of the animal so that a signal can be generated and communicated to the operator. Examples are shown in European Application 108,330 (Weiland) published 16 May 1984, in U.S. Pat. No. 4,264,900 (Charlier) issued 28 Apr. 1981 and in U.S. Pat. No. 4,319,583 (Ingle) issued 16 Mar. 1982.

Also in U.S. Pat. No. 4,651,677 (de Wit) issued Mar. 24, 1987 is shown an arrangement in which a microphone detects sounds emitted by a sow and/or the piglets and analyzes the sounds to determine the condition of birthing or crushing of the piglets to summon the operator. This arrangement is apparently not currently available in the market place.

The problem of monitoring the onset of birth can of course be resolved by providing enough work people to ensure that sows are closely visually monitored to ensure that the person is available as soon as possible after the onset so that all viable piglets are extracted and protected. However many such hog facilities are located in areas where labor costs are such that close monitoring of this nature is not economically feasible.

However despite the proposal of the above techniques for detecting the onset of birth of the piglets, in practice this remains a problem and no effective economic systems are available for this purpose.

Another aspect of protecting piglets after birth is that of providing a suitable location within the farrowing pen for receiving and containing the piglets while keeping them away from the sow where they can be crushed.

In U.S. Pat. No. 4,478,175 (Fisher) issued Oct. 3, 1984 is disclosed a temperature controlled heated nest box for the piglets after birth.

In a brochure by Veng Systems is disclosed a heating lamp and cover panel arranged to be located in the farrowing pen with a temperature sensor to maintain the covered area of the pen at a predetermined temperature for the piglets. No patent or published patent application describing this machine has been found.

Other patents and published documents in this general field are as follows:

PCT/DK2001/000812, WO 02/046850, Inventor: Niels Skov Veng which discloses a control system.

French Patent: FR2579452A1, Inventor: Guy Houssin, registered 29 Mar. 1985 which discloses a device including a contact which is displaced by an arriving piglet for detecting birth;

French Patent: FR2582507A1, Inventor: Paul Fuseau, registered 4 Jun. 1985 which discloses a device mounted in the uterus for detecting the onset of birth;

PCT Published Patent Application WO03/056907A1, Inventor: Jan Tambo, published the 17 Jul. 2003 which discloses a heating control system for piglets.

US Published Patent Application 2007/0262859 Inventor: Marjolaine Henry, published the 15 Nov. 2007 which discloses detection of the birthing process either by a motion sensor or by a weight sensor at the piglet area and the transmission of a signal to the worker in the barn.

SUMMARY OF THE INVENTION

It is one object of the invention to provide a method for detecting the onset of birth of piglets for example so that birthing is detected in time to provide a signal to an operator to attend the birthing with the opportunity to reduce deaths of the piglets at birth.

Such deaths can occur for many reasons notably the following:
  crushing
  Trauma risks
  Death by inanition
  Splay leg, disability, congenital abnormality
  Stillborn
  Infection, diarrhea According to one aspect of the invention there is provided an apparatus for use in a farrowing crate having a sow containing area and at least one piglet area into which the piglets can move, the apparatus comprising:
  a control unit;
  a temperature sensor for communicating temperature data to the control unit;
  a mounting assembly for the temperature sensor for mounting the sensor at the farrowing crate;
  a system for communication to a worker of commencement of birth of the piglets;
  wherein the control unit and the temperature sensor are arranged so as to detect an increase in temperature in the pen at a sensing position in the pen arranged so as to detect the presence in the pen of a piglet after birth.

Preferably the sensor is a sensor for location in the pen at a position spaced from its sensing position. Such sensors can be of the type which receives radiation, generally in the infra-red range, from the body or area to be sensed. Thus the sensor is located at a position spaced from the area which it is sensing and has an angle of observation of the radiation emitted which can be very narrow or can be larger to detect the temperature of a larger part of the piglet area. The directional or laser type infra red type sensor is particularly effective in that it can be located away from the area to be monitored where it is protected from contact and potential damage and yet can readily detect the increase of temperature which occurs when the body of the newly born piglet enters the area of detection. This temperature increase occurs because the pen itself and the area to be detected is maintained at a temperature below body temperature in order to maintain the sows in the most comfortable environment without overheating.

However other types of sensor can be used with measure directly at the location to be sensed.

Preferably the sensor is an infrared heat sensor. However other types of sensor can be used.

Preferably the communication system of the control unit communicates wirelessly with the worker. However other types of communication can be used.

Preferably the sensor is mounted on a cover at the piglet area. However the sensor can be located and mounted at other positions including on the crate itself.

Preferably there is provided a heating device or more than one heating device in the piglet area and the sensor is mounted adjacent the heating device for example on a cover.

Preferably the control unit also actuates and controls the output of the heat lamp or lamps.

Preferably the heat lamp or lamps and the sensor or sensors are mounted on a cover at the piglet area. In this case the cover may be movable at the piglet area. Thus the cover may be movable for example by sliding along a guide arrangement at the piglet area to cover different parts of the piglet area In addition or alternatively, the cover may be mounted so as to be movable to a raised position exposing the piglet area.

According to a second aspect of the invention there is provided an apparatus for use in a farrowing crate having a sow containing area and at least one piglet area into which the piglets can move, the apparatus comprising:

a combination of a birth sensing system and a piglet heating system comprising:

a control unit;

a temperature sensor for communicating temperature data to the control unit;

a mounting assembly for the temperature sensor for mounting the sensor at a piglet area in the farrowing crate;

and a heating lamp; wherein the control unit and the temperature sensor are arranged so as to detect an increase in temperature in the pen at a sensing position in the pen arranged so as to detect the presence in the pen of a piglet after birth;

wherein the control unit is arranged to actuate the heating lamp on detection of the presence in the pen of one or some piglets at birth;

and wherein the control unit is arranged to control heat output from the lamp to regulate the temperature in the piglet area at a predetermined curve level.

According to a third aspect of the invention there is provided an apparatus for use in a farrowing crate having a sow containing area and at least one piglet area into which the piglets can move, the apparatus comprising:

a heating lamp;

wherein the heating lamp is mounted on a cover arranged for covering the piglet area;

and wherein the cover is movable along the piglet area to cover different parts of the piglet area.

Other types of sensor can be used in some cases which include notably the following:

Movement detector

Camera

"Micro switch" (used by the operator, turns on and off manually)

Mat that detects movement by sensing the piglets

Preferably there is also provided in the farrowing pen an area for receiving the piglets at a position in the pen spaced from the sow to protect the piglets from crushing. The area includes a heating system for maintaining the piglets at a desired temperature for encouraging them to remain in the area, bearing in mind that the farrowing pen itself is preferably maintained at the above lower temperature more suitable for the sows. The system control provides a signal which is sent to the heat control system to set the heating system in operation automatically causing the heat lamp to be turned on. This allows the heating system to remain off until it is required and also creates a warm location to attract the piglets immediately after they are born thus attracting them away from the area of the sow where they can be crushed. In another arrangement the sensing system and the heating system operate as a combined system where a single sensor is provided which is moved from detecting at the sensing position to detecting at the area after the onset of birth is detected and is arranged to provide a control signal to a heat control system for controlling the heating system.

The birth detector system may be an entirely separate system from the heating system and cover system, so that it is not considered as one whole integral system. It is one option that the systems be combined but also it may be an important factor for the commercialization of the product to be able to separate the three systems.

Preferably the farrowing crate is located in a farrowing room which includes a series of such crates and the signal contains information identifying the crate concerned.

Preferably the farrowing crate is located in a farrowing room which includes a series of such crates and each crate contains at least one separate sensor.

Preferably at least some of the sensors are connected to a common central unit or circuit board arranged to generate and communicate the signal to the operator in response to a signal from one of the sensors connected thereto.

In the system installed in each pen there are algorithms that permit the detection of the births and control the temperature. The temperature variation is realized by receiving temperature signals that increase or decrease the power transmitted to the heating element such as a heat lamp, radiator or a heating mat. In this regard, the system must receive, on constant intervals, the temperature signals.

The cover can also be provided to cover substantially the whole of the piglet area and can just be lifted to expose the area. However this Is not preferred as the intention is that the cover be located at the front end during all times with the exception of the actual birthing time when the cover is moved to the rear end to immediately attract, detect and warm and dry up the piglets after birth. Thus as soon as the birthing process is over, the worker moves the cover to the forward end of the crate.

The sensor can be used with or without a cover. The heating system can also be used with or without a cover. The movable cover can be equally used with or without the sensing system and or the heating system.

A single temperature sensor having sufficient area of sensing can be used centrally between two crates to detect in both adjacent crates.

The cover can use a shock absorber in the hinging movement to assist in lifting forces and to slow any downward or upward movement in the event the cover is dropped or lifted with force to avoid damage to the heating element which can be damaged on impact.

BRIEF DESCRIPTION OF THE DRAWINGS

One embodiment of the invention will now be described in conjunction with the accompanying drawings in which.

DETAILED DESCRIPTION

Figure 1:
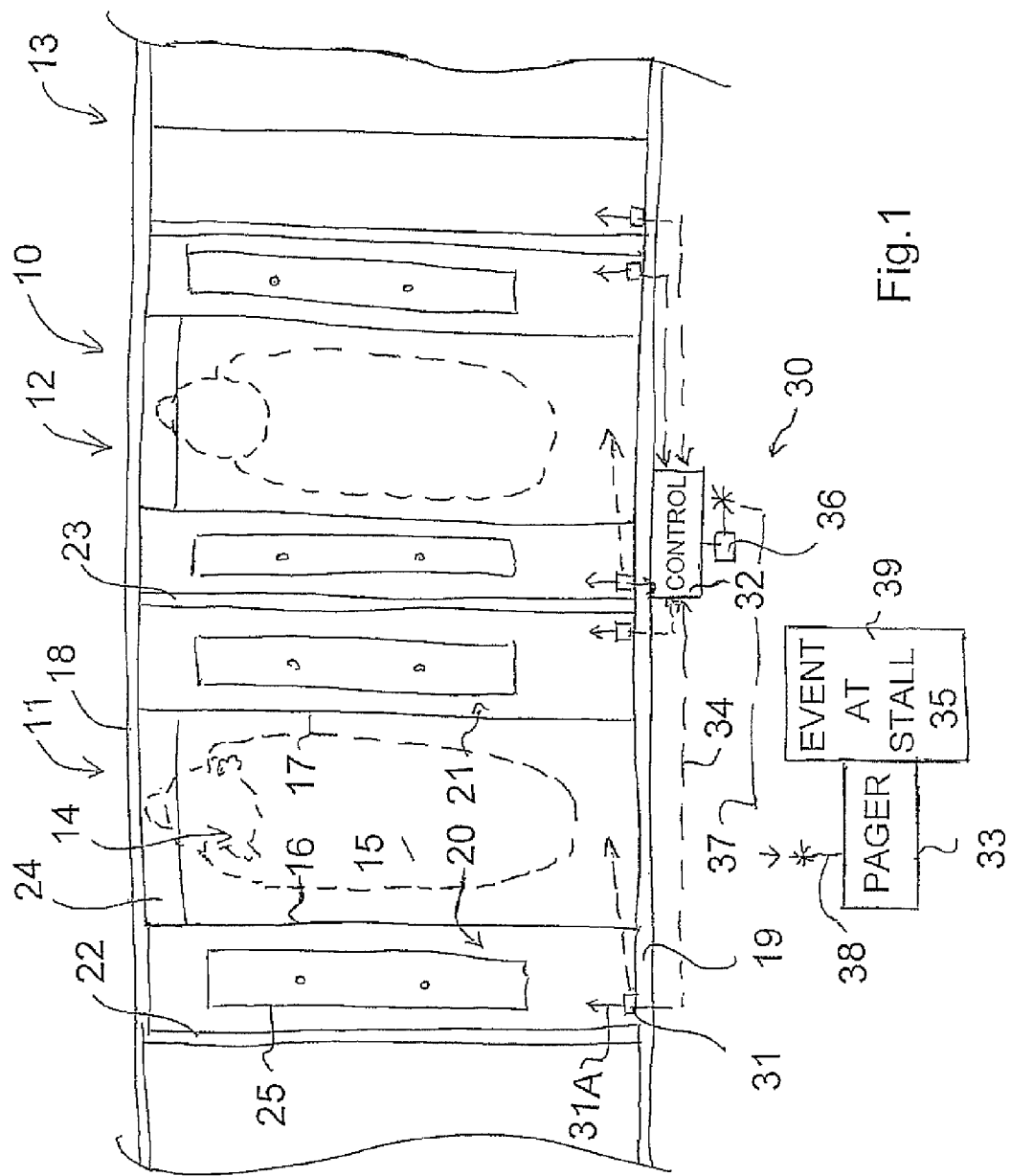
FIG. 1 is a schematic plan view of a series of farrowing crates including one example of a birth monitoring system according to the present invention.

In FIG. 1 is shown a row of farrowing crates where the row is generally indicated at 10 and includes a series of farrowing crates indicated at 11, 12, 13 etc. Each farrowing crate is identical to the others so that one is shown particularly at 11 and includes a sow containing area 14 with a floor 15 on which the sow can stand and lie defined by side edges 16 and 17. The sow containing area extends forwardly to a front wall 18 and rearwardly to a rear wall 19. On one side or as shown on each side of the sow containing area 14 is defined a piglet receiving area 20 and 21. In most cases there is provided a piglet receiving area on each side of the sow containing area so that the piglets can move to either side of the sow depending upon the direction to which the sow is lying. However in some cases there may be only a single area on one side.

The crate is closed at the sides by walls 22 and 23. All of the walls 18, 19, 22 and 23 can be formed from posts and rails or may be sheet metal to prevent air penetration and there may be provided a gate at the front and/or rear.

In many cases the sow area 15 includes a feeder 24 at the front wall 18 from which the sow can take feed. The piglet containing areas 20 and 21 as shown each include a heating system 25 for applying heat to the areas to keep the piglets at the required temperature. In the embodiment shown in FIG. 1 the heating system 25 comprises an overhead lamp or other heating element mounted in each area. It will be appreciated that the temperature of the barn must be controlled to maintain the sow at a suitable temperature and this is often too cold for the piglets so that they must be heated by a supplementary heat source. It is also desirable to keep the piglets away from the sow as much as possible so as to reduce the possibility of crushing when the sow stands and lies. Suitable anti-crushing methods are well known to persons skilled in the art and include anti-crush bars at the side edges 16 and 17 and other systems of a more complex nature.

A monitoring system is provided generally indicated at 30 which includes a temperature sensor 31, a control unit 32 and a pager 33 or other communication device such as a cell phone. The temperature sensors 31 of the system are preferably conventional temperature sensors of the remote infra-red type which detects temperature along a directional line 31A. Such systems are generally infra-red detectors but other sensors may also be used. Examples of such sensors are readily available.

Each sensor 31 is mounted so that its direction sensing line can be moved within the pen to detect at required locations as shown at 31A and 31B. For this purpose the sensor includes a bracket 31C shown schematically in FIG. 2 so that the sensor can be rotated and tilted downwardly to take up a required direction. As an alternative, the bracket may be fixed to the sensor and the sensor moved from one location to another to take up the required directions. Thus the bracket may be a simple strap which wraps around a bar of the farrowing pen with the location of the sensor on the bar defining the required direction.

Each sensor is connected to a central control unit 32 as shown in FIG. 1 by a respective wire 34 so as to provide to the control unit an indication of which sensor has been activated by motion within the respective piglet area.

Figure 2:
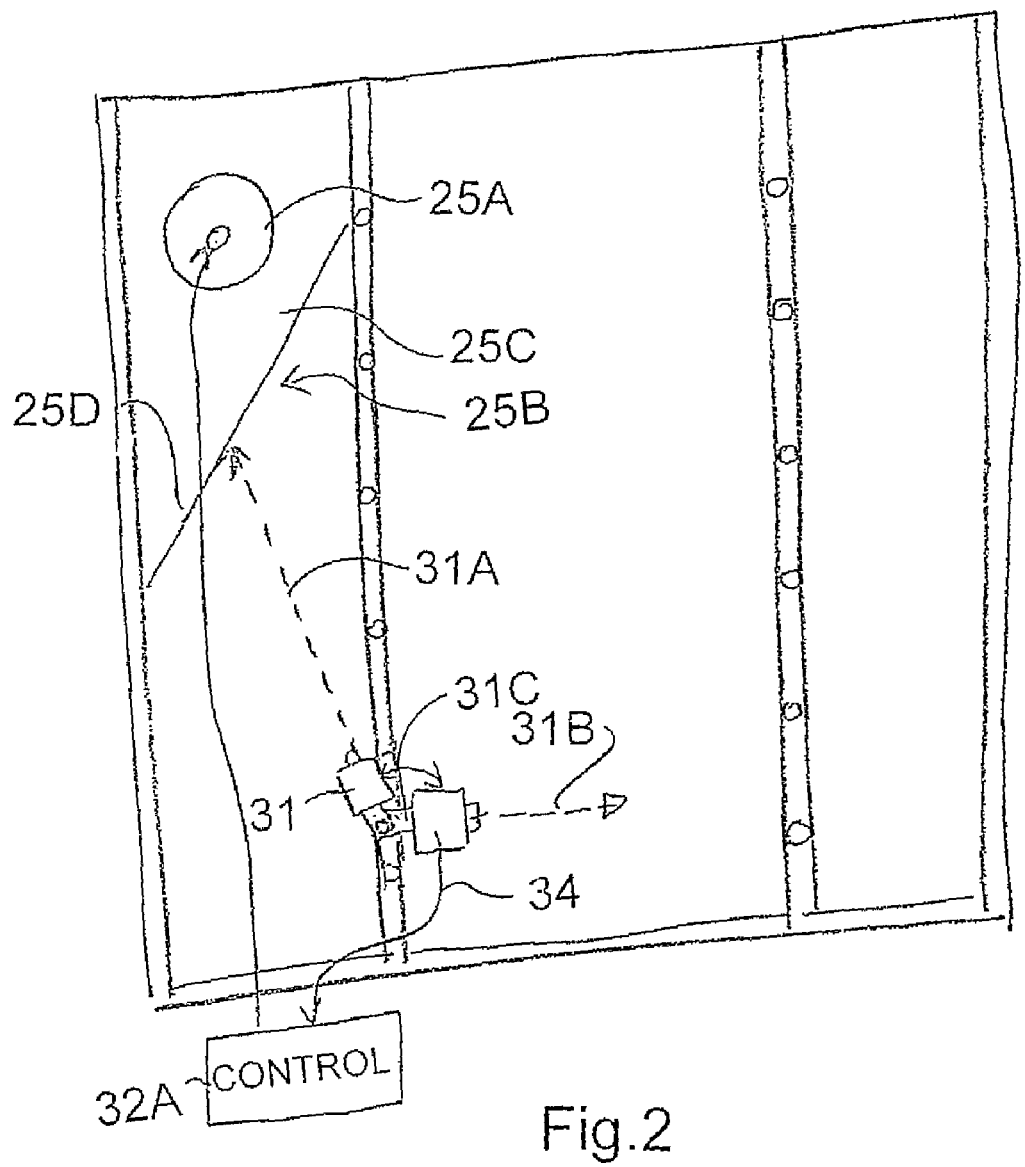
FIG. 2 is a schematic plan view of one of the farrowing crates including a heating and cover arrangement for the piglets and a monitoring system according to the present invention.
Figure 3:
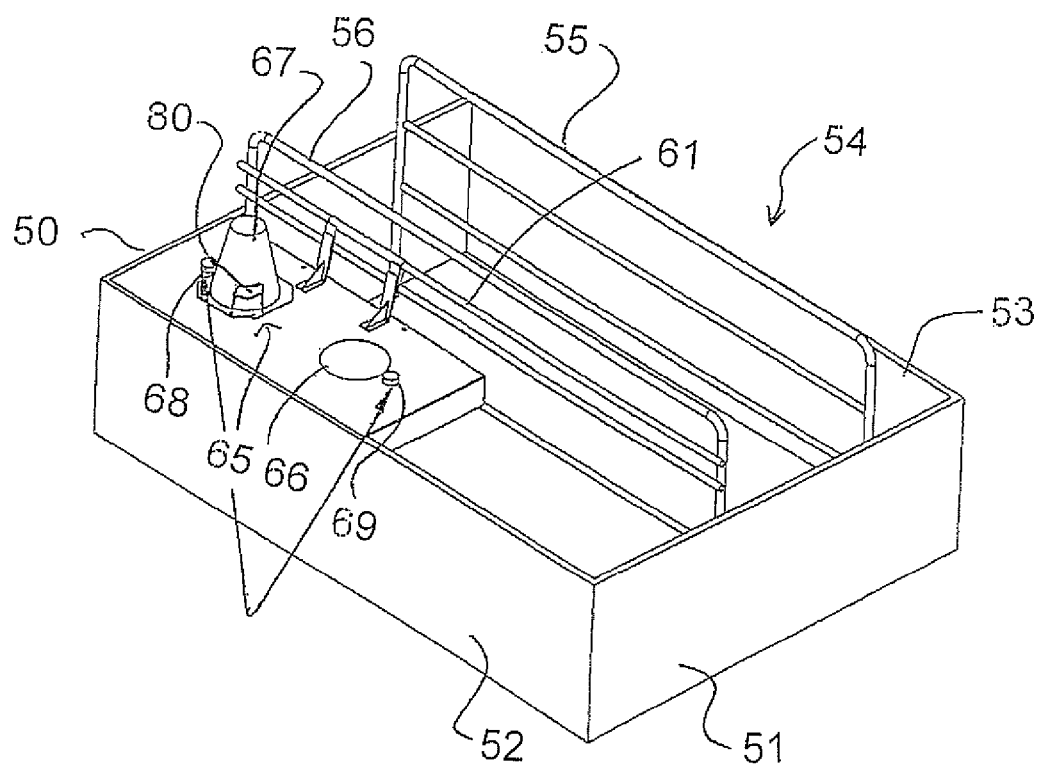
FIG. 3 is an isometric view of one of the farrowing crates including a movable cover and heating arrangement for the piglets in the front position together with the birth monitoring apparatus.
Figure 4:
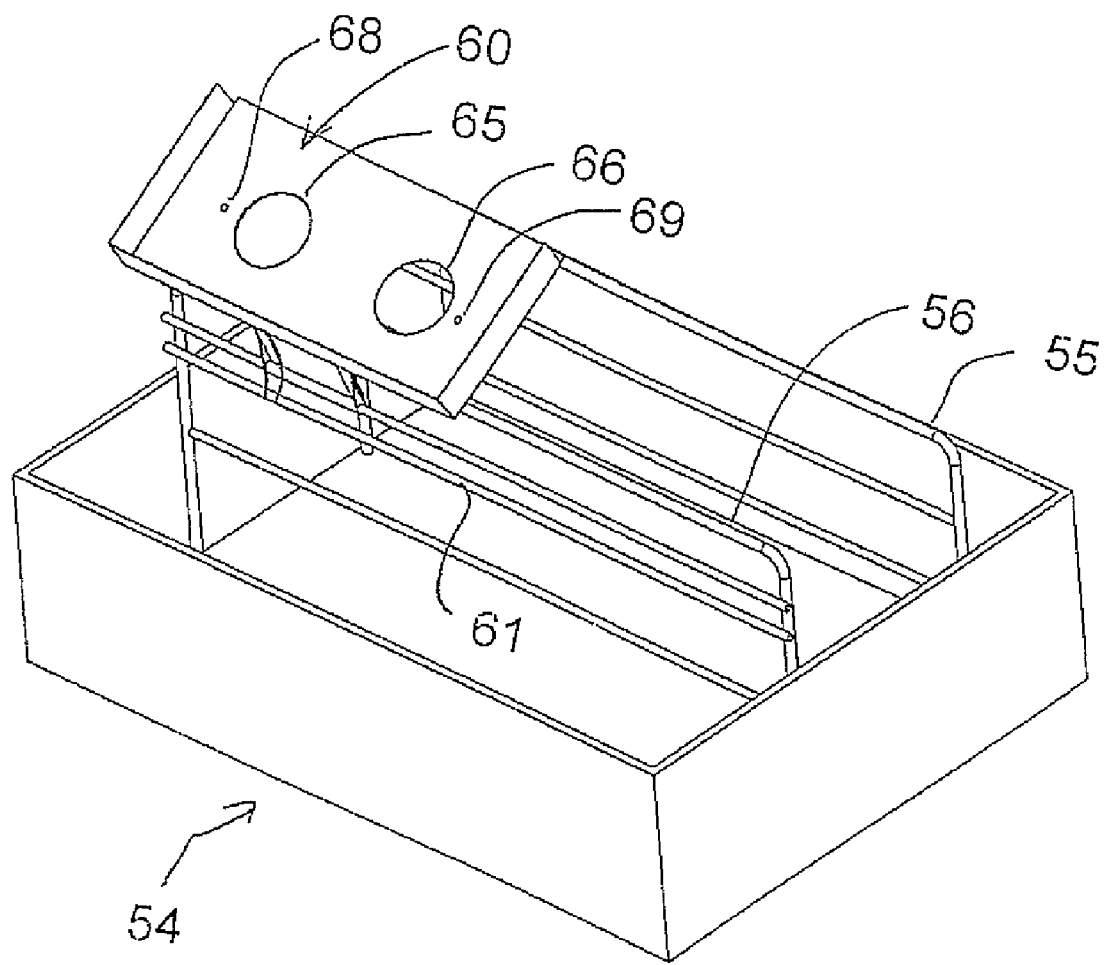
FIG. 4 is an isometric view of the farrowing crate of FIG. 3 with the movable cover in a raised position.
Figure 5:
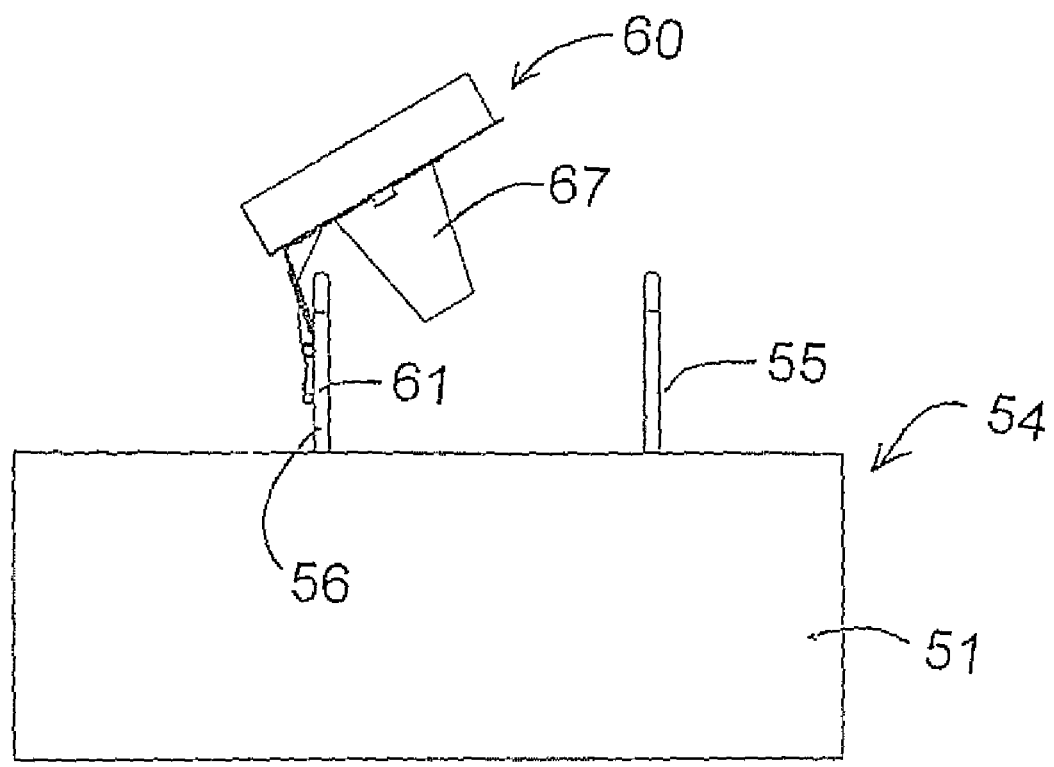
FIG. 5 is a rear elevational view of the farrowing crate of FIG. 3 with the movable cover in a raised position.

In FIG. 2 each pen can include its own control unit forming part of an assembly of parts including the sensor 31, a control 32A and a heating system 25A. These elements can form a common assembly which can be connected to an electrical supply and can be disconnected to be moved from crate to crate as required.

The control unit includes an antenna 36 which transmits a signal 37 to the antenna 38 of a pager or similar device 39. The control unit is arranged such that the signal 37 includes information identifying the particular stall involved. The pager includes a screen 39 which indicates to the operator of the hog facility that a motion event has occurred and indicates the stall at which the motion has taken place. The system can be installed relatively inexpensively at the crates of the farrowing area. Thus when each sow is pregnant and ready to give birth, the sow is moved from an initial containment area into a respective one of the crates for the birthing process.

Up till now it has been necessary for the operator to maintain a watch over the sows and to use skills obtained from experience to know approximately when the sow will give birth. Even despite such experienced operators, it is possible for the sow to give birth without any attention and this can lead to the loss of piglets either by crushing or by still births. It is well known that early intervention during the birthing process can reduce the number of losses by an average of one or two piglets per sow per gestation. Such average losses provide thus a significant loss of income. A typical sow facility of this type may contain one thousand sows and an operator is present at all times but is involved in many functions during the working day. In individual cases, early intervention may prevent the loss of the whole litter or a significant part of the litter, which would otherwise dramatically increase average or cumulative losses.

The present system therefore provides an indication to the operator as to the presence of a piglet at a crate so that the operator may immediately move to the crate concerned and intervene in any problems that are arising. Stillbirths can be reduced by reducing difficulties in the birthing process by assisting where necessary. Crushing can be reduced by ensuring that the piglets are moved to the required area. The heating system can be turned on only when the birthing is actually occurring so as to reduce cost and to ensure the heating system is available as soon as the piglets are expelled thus increasing their tendency to move away from the sow to the heated areas within the corners of the crate.

Even though the birthing process is detected by the temperature change caused by the arrival of the first or one of the first piglets, rather than by detecting the actual ejection of the first piglet, it has been found that this indication can be effected simply and effectively and yet provides a signal to the operator allowing intervention at a sufficiently early stage to provide the reduction in losses which can otherwise occur.

The sensor 31 in the arrangement of FIG. 2 is thus initially directed at the area behind the birth canal of the sow so that the arrival of the first piglet in that area is detected by the change in temperature. This detection by the sensor 31 is communicated to the control unit 32A for generation of an alarm signal to the responsible worker. The alarm signal can be generated by a central control unit using wireless communication or can be a simple alarm signal such as a sound and light generating system generated at the control unit 32A. After the worker is summoned and attends the birth for protection of the remaining piglets, the sensor can be moved to a position to detect temperature in a piglet area 25B adjacent the heating system 25.

The control unit at the same time as sending the alarm signal also acts to start the heating action of the heating system 25 to heat the piglets in the area 25B. The control unit can be set to maintain a required suitable temperature for the piglets in the area 25B bearing in mind that the piglets prefer to be maintained in a temperature higher than the surrounding farrowing pen for the sow and bearing in mind that the piglets generate several watts of heat themselves so that the area needs to be topped up with heat to maintain the required temperature. Thus the smart controller for the heating device uses a pre-set curve for the temperature to be maintained for the piglets so that the temperature declines as the piglets get older from a maximum when they are first born to a minimum at the weaning stage. The sensor detects the actual temperature under the cover and the control unit on the lamp controls the time period of operation of the lamp or controls the power output of the lamp to maintain the temperature at the required level based on the set curve.

In the embodiment shown, the area 25B includes a cover 25C having a front edge 25D over the piglet area and rear edges at the side and front wall of the pen. In this way the piglets are maintained in a covered area or nest area where they can be kept warmed and protected causing all of the piglets to congregate in this area under the heat lamp.

This use of a covered area and temperature control can avoid the use of a heat pad on the floor of the pen which pads are inconvenient and tend to be wasteful as they add heat to the environment and thus heat the sow.

The heating system thus comprises a single heat lamp mounted in the cover and projecting downwardly toward the piglets and the floor. This area thus causes the piglets to congregate away from the area under the sow thus tending to reduce the risk of crushing.

While there are two piglet areas one on each side of the sow for free movement of the piglets, it is preferred that only one includes the cover and heating to reduce complexity and cost. However each side may include a covered heated area if preferred.

It is preferred that a single sensor be used which can serve both functions of birth detection and temperature control. However two separate sensors can be provided as part of two separate systems with the sensor for the detection being associated with the central control system of FIG. 1 and the heating systems being independent of the birth detection system.

The sensor can be placed in many different locations such as suspended above the area, attached to the lamp, etc.

Also, the piglet area may not always be covered since many arrangements simply using the heating system without a cover are possible.

One possibility is that each pen is equipped with an individual control system. As an alternative, there is the possibility that the sensor of a pen is connected wirelessly or by wire to the control system of a zone, which is connected wirelessly or by wire to a network.

One important feature of the invention is the automatic actuation of the heating system causing the heat lamp to be turned on, which feature is not limited to a particular form or arrangement of sensing system such as the infra red sensor described above.

The actuation of the heating system acts to attract the piglets away from the sow to prevent crushing and so that the heating system is actuated only when required to reduce heating costs. In this way the heating system comes into effect only when the piglets are being born to avoid unnecessary use prior to this time, bearing in mind that the cost of such heating is significant and the use of the heating is undesirable to keep the sow cool. Also the sensor actuation is preferably used with the sensor temperature monitoring to further ensure cost savings by using minimum energy to keep the piglets at the required temperature, again bearing in mind that the heat generated by the piglets themselves increases as they become larger thus reducing heat requirements.

Other types of sensors can be used.

Where the system states that wireless communication can be used it will be appreciated that communication with wires is also possible.

Thus the circuit board can be connected to the sensors by wires or by sound, which alarms the operator who can notice clearly which pen is concerned.

Turning now to FIGS. 3 to 6 there is shown a heating and cover system for the piglet area which can be used with the birth monitoring apparatus or can be used without the apparatus.

Thus the crate 54 includes a front wall 50, a rear wall 51 and two side walls 52 and 53 all of which are formed of closed sheet material such as plastics, fibreglass or metal to contain the piglets and to keep drafts from them. Two upstanding panels 55 and 56 formed by horizontal and vertical rails act to confine the sow from respective sides leaving space between the panels and the sides of the crate for the piglets to be contained.

A cover 60 is located between the panel 56 and the side wall 52 and is dimensioned to have a width filling the space between the panel and the side wall and a length approximately equal to one third to one half of the length of the crate. The cover is mounted on one of the rails 61 of the panel 56 by brackets 62 which allow the cover to slide between the position shown in FIG. 2 at the front end and the position shown in FIG. 6 at the rear end. This sliding action is effected simply by the sliding of the brackets on the rail 61.

The brackets are arranged such that the cover can be lifted on the rail 61 by rotation of the cover around the axis defined by the rail to a position where the cover is moved away from the piglet area and inverted over the sow containment area. In this position the operator has access to the piglet area for accessing the piglets and for cleaning the piglet area.

The cover when supported in the lowered operating position is at the top of the side wall 52 so as to enclose the piglets within the crate underneath the cover to prevent cool air penetration or heated air escape.

The cover has a pair of mounting holes 65 and 66 each of which, or both of which, can receive a heating lamp 67 which is carried in the cover so as to shine heat downwardly into the area underneath the cover. One hole is located at one end of the cover and the other at the other end of the cover. Alongside each lamp mounting hole is located a sensor mounting hole on the side of the lamp adjacent the end of the cover. Thus in the position of FIG. 3 the lamp is in the hole at the front end of the cover with the temperature sensor between it and the front wall. Thus in the position of FIG. 6 the lamp is in the hole 66 at the rear end of the cover with the temperature sensor between it and the rear wall.

Figure 6:
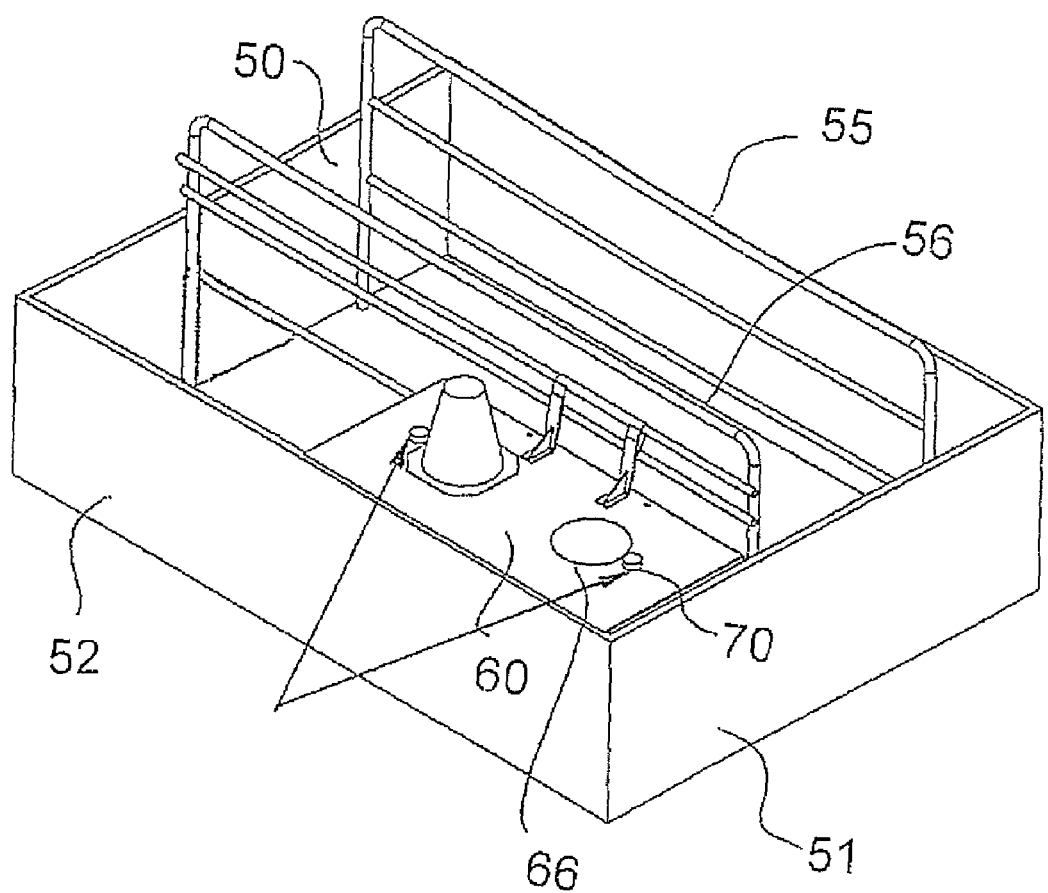
FIG. 6 is an isometric view of the farrowing crate of FIG. 3 with the movable cover in a rear position together with the birth monitoring apparatus.

In operation, when the sow is about to give birth, the cover is moved to the position of FIG. 6 with the sensor adjacent the rear end of the sow. As soon as the first piglet is expelled it moves away toward the piglet area and enters the zone of detection of the sensor 70 where the temperature rise relative to the bare area is detected and communicated to the control unit 80. The control unit can be located at any suitable position for example on the cover. However preferably it is formed as part of the lamp control circuitry and mounted on the heating device housing. The control unit then detects from this temperature rise the presence of the piglet and actuates both the signal to the worker and the power to the lamp 67 immediately. The worker is thus summoned to deal with the birth. The worker can slide the cover away from the rear end either partly or wholly toward the front end to allow access to the piglets.

At the same time as sending the alarm signal, the lamp is actuated which acts to immediately heat the piglets while they are most vulnerable and also acts to draw them away from the sow toward the heat lamp which reduces the likelihood of crushing.

After the birth and during the suckling stage, the piglets are protected under the cover which is located in the front end of the crate, encouraging the piglets to locate at the front end and thus tending to prevent the piglets from being crushed or hurt under the sow. Also the lamp heat output is controlled by the control unit based upon the sensed temperature underneath cover in the area of the piglets so that their temperature is maintained at the best level while allowing the heat output to decline depending upon the amount of heat emanating from the piglets, thus reducing energy requirements.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. An apparatus for use in raising pigs comprising:
a farrowing crate having a sow containing area and at least one piglet area into which the piglets can move; and a combination of a birth sensing system and a piglet heating system comprising:
a control unit;
a temperature sensor for communicating temperature data to the control unit;
a mounting assembly for the temperature sensor for mounting the sensor at the farrowing crate at a sensing position in the crate; and
a heating device arranged to generate a heated area in the piglet area within which the piglets are kept heated;
wherein the control unit detects an increase in temperature in the crate at the sensing position in the crate;
the mounting assembly having a first position in which the sensor detects temperature of the piglets present in the farrowing crate at a position in the farrowing crate different from the heated area for detecting the presence of the piglets after birth while avoiding detecting the temperature of the sow;
a system for communication to a worker of a signal indicative of commencement of birth of the piglets;
wherein the control unit on detection by the sensor of a rise in temperature caused by the presence of the piglets after birth causes communication of the signal to the worker;
wherein the control unit on detection by the sensor of a rise in temperature caused by the presence of the piglets after birth actuates the heating device;
wherein the mounting assembly has a second position in which the sensor detects temperature of the piglets in the heated area; and
wherein the control unit controls heat output from the heating device to maintain the temperature in the piglet area at a predetermined level.

2. The apparatus according to claim 1 wherein the sensor is a remote sensor for location in the crate at a position spaced from the sensing position.

3. The apparatus according to claim 1 wherein the sensor is an infrared heat sensor.

4. The apparatus according to claim 1 wherein the sensor is mounted adjacent the heating device.

5. The apparatus according to claim 1 wherein there is provided a cover arranged for covering a part only of the piglet area, wherein the cover is mounted for movement longitudinally along the piglet area from a rear end of the farrowing crate to cover a part only of the piglet area at the rear end to a forward end of the farrowing crate to cover a part only of the piglet area at the forward end and wherein the heating device and the sensor are mounted on the cover at the piglet area for heating the piglet area under the cover and movable with the cover.

* * * * *